United States Patent
Szymanski

(10) Patent No.: US 12,330,461 B2
(45) Date of Patent: Jun. 17, 2025

(54) HYDRAULIC LIFT FOR VEHICLE SUSPENSION

(71) Applicant: BeijingWest Industries Co., Ltd., Beijing (CN)

(72) Inventor: Jerzy Piotr Szymanski, Villeneuve les Sablons (FR)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 18/519,043

(22) Filed: Nov. 26, 2023

(65) Prior Publication Data

US 2024/0174041 A1    May 30, 2024

Related U.S. Application Data

(60) Provisional application No. 63/428,407, filed on Nov. 28, 2022.

(30) Foreign Application Priority Data

Nov. 7, 2023   (CN) .......................... 202311477032.6

(51) Int. Cl.
*B60G 17/015*   (2006.01)
*B60G 15/06*    (2006.01)
*B60G 17/019*   (2006.01)

(52) U.S. Cl.
CPC ....... *B60G 17/0152* (2013.01); *B60G 15/062* (2013.01); *B60G 17/019* (2013.01);
(Continued)

(58) Field of Classification Search
CPC .......... B60G 2500/30; B60G 2400/252; B60G 2206/70; B60G 2206/41; B60G 2204/43;
(Continued)

(56) References Cited

U.S. PATENT DOCUMENTS 3,776,536 A * 12/1973 Henderson ................ F16F 5/00
                                                267/64.25
4,125,276 A * 11/1978 Levasseur ............ B60G 21/055
                                                280/124.108
(Continued)

FOREIGN PATENT DOCUMENTS

CN     108312801 A     7/2018
CN     214367461 U    10/2021
(Continued)

OTHER PUBLICATIONS

DE 102006006871 A1 machine translation from espacenet (Year: 2024).*

(Continued)

*Primary Examiner* — Faye M Fleming
*Assistant Examiner* — Maxwell L Meshaka
(74) *Attorney, Agent, or Firm* — Dickinson Wright PLLC

(57) ABSTRACT

A hydraulic life actuator for adjusting a height of a vehicle includes: a damper tube including a closed end; a damper rod protruding from the damper tube opposite the closed end; a sliding spring seat disposed annularly around the damper tube and configured to engage a coil spring; a support collar disposed annularly around the damper tube and fixed to the sliding spring seat, wherein the support collar is configured to translate axially relative to the damper tube; a lifting bracket connected to the support collar and protruding radially from the support collar; and a hydraulic cylinder disposed adjacent and parallel to the damper tube and having a lift piston rod disposed extending outwardly therefrom, wherein the lift piston rod is connected to the lifting bracket and configured to actuate the sliding spring seat between a retracted position and an extended position spaced apart from the closed end.

18 Claims, 3 Drawing Sheets

(52) U.S. Cl.
CPC .. *B60G 2202/312* (2013.01); *B60G 2202/413* (2013.01); *B60G 2204/43* (2013.01); *B60G 2206/41* (2013.01); *B60G 2206/70* (2013.01); *B60G 2400/252* (2013.01); *B60G 2500/30* (2013.01)

(58) Field of Classification Search
CPC ........ B60G 2202/413; B60G 2202/312; B60G 17/019; B60G 15/062; B60G 17/0152; B60G 17/0272; B60G 17/027
See application file for complete search history.

(56) References Cited

U.S. PATENT DOCUMENTS

| | | | | |
|---|---|---|---|---|
| 5,013,067 | A * | 5/1991 | Mine | B60G 17/0165 280/6.154 |
| 6,561,304 | B1 * | 5/2003 | Henry | B62D 7/06 180/402 |
| 6,902,045 | B2 | 6/2005 | Oliver et al. | |
| 7,665,585 | B2 * | 2/2010 | Alexandridis | B60G 17/0152 248/562 |
| 8,408,561 | B2 * | 4/2013 | Mochizuki | B60G 17/027 280/124.16 |
| 9,162,548 | B1 * | 10/2015 | Wakeman | F16F 1/121 |
| 9,586,456 | B2 | 3/2017 | Reybrouck | |
| 11,021,029 | B2 | 6/2021 | Harrison | |
| 11,718,137 | B2 * | 8/2023 | D'Orazio | B60G 15/062 280/5.514 |
| 2006/0060750 | A1 * | 3/2006 | Alexandridis | B60G 17/021 248/588 |
| 2011/0101632 | A1 * | 5/2011 | Mochizuki | F16F 9/56 280/6.157 |
| 2021/0268857 | A1 * | 9/2021 | D'Orazio | F16F 9/3264 |
| 2024/0116319 | A1 * | 4/2024 | D'Orazio | F16F 9/3264 |
| 2024/0166007 | A1 * | 5/2024 | Chaumette | B60G 17/0152 |
| 2024/0166008 | A1 * | 5/2024 | Szymanski | B60G 17/0272 |
| 2024/0174041 | A1 * | 5/2024 | Szymanski | B60G 17/0152 |

FOREIGN PATENT DOCUMENTS

| | | | | |
|---|---|---|---|---|
| CN | 111645624 | A | 5/2022 | |
| DE | 102006056632 | A1 | 3/2007 | |
| DE | 102006006871 | A1 | 8/2007 | |
| DE | 102009053125 | A1 | 5/2011 | |
| DE | 102011085233 | A1 * | 5/2013 | ......... B60G 17/0272 |
| DE | 102016201752 | A1 * | 4/2017 | |
| DE | 102017106683 | A1 * | 10/2017 | ............ B60G 15/10 |
| DE | 102016213426 | A1 * | 1/2018 | ........... B60G 15/065 |
| DE | 102016221307 | A1 * | 5/2018 | |
| DE | 102016223237 | A1 * | 5/2018 | |
| DE | 102023200676 | B3 * | 6/2024 | |
| EP | 0583546 | A1 * | 2/1994 | |
| JP | 59102608 | A | 6/1984 | |

OTHER PUBLICATIONS

Extended European Search Report issued on Apr. 19, 2024 for counterpart European patent application No. 23212239.0.

* cited by examiner

HYDRAULIC LIFT FOR VEHICLE SUSPENSION

CROSS REFERENCE TO RELATED APPLICATIONS

This U.S. utility patent application claims the benefit of U.S. Provisional Patent Application No. 63/428,407, filed Nov. 28, 2022, and China Non-Provisional Patent Application No. CN202311477032.6, filed Nov. 7, 2023, the contents of each are incorporated herein by reference in their entirety.

BACKGROUND OF THE INVENTION

1. Field of the Invention

The present disclosure relates generally to systems for adjusting the height of a vehicle. More specifically, the present disclosure pertains to an electro-mechanical system for adjusting the height of a vehicle having stand-alone coil springs, and an actuator for such a system.

2. Related Art

Systems capable of changing vehicle height can enable additional functionalities and play important role to improve vehicles energy efficiency. However, development of electro-mechanical solutions for adjusting vehicle ride height encounter number of technical and costing challenges.

U.S. Pat. No. 6,902,045 describes one such example of a system for adjusting vehicle height. The system and apparatus of U.S. Pat. No. 6,902,045 may be used to adjust the height of a front end of a vehicle having a coil-over shock suspension.

SUMMARY OF THE INVENTION

The present disclosure provides a hydraulic lift actuator for adjusting a height of a vehicle. The hydraulic lift actuator includes: a damper tube including a closed end; a damper rod disposed at least partially within the damper tube and protruding therefrom opposite the closed end; a sliding spring seat having a disc shape disposed annularly around the damper tube, the sliding spring seat including an upper surface facing away from the closed end and configured to engage an end of a coil spring disposed coaxially around the damper rod; a support collar having a tubular shape disposed annularly around the damper tube and fixed to the sliding spring seat, wherein the support collar is configured to translate axially relative to the damper tube; a lifting bracket connected to the support collar and protruding radially from the support collar; and a hydraulic cylinder disposed adjacent and parallel to the damper tube, the hydraulic cylinder having a lift piston rod disposed at least partially within the hydraulic cylinder and extending outwardly therefrom toward the lifting bracket, wherein the lift piston rod is connected to the lifting bracket and configured to actuate the sliding spring seat between a retracted position and an extended position spaced apart from the closed end.

The present disclosure provides a hydraulic lift actuator for adjusting the height of a vehicle. The hydraulic lift actuator includes: a damper assembly including a first end and a second end opposite the first end; a damper rod disposed at least partially within the damper assembly and protruding through the second end; a sliding spring seat having a disc shape disposed on an outer surface of the damper assembly, the sliding spring seat including an upper surface facing away from the first end and configured to engage a lower end of a coil spring disposed coaxially around the damper rod; a support collar fixed to the sliding spring seat, wherein the support collar is configured to translate axially relative to damper assembly; and a hydraulic cylinder disposed adjacent and parallel to the damper assembly, the hydraulic cylinder having a lift piston rod disposed at least partially within the hydraulic cylinder and extending outwardly therefrom toward the support collar, wherein the lift piston rod is connected to the support collar and configured to actuate the sliding spring seat between a retracted position and an extended position spaced apart from the first end.

The present disclosure provides a height adjustment system for adjusting the height of a vehicle. The height adjustment system includes: at least one wheel; a first suspension arrangement including: a coil spring having an upper end and a lower end, wherein the upper end is connected to the at least one wheel, and a hydraulic lift actuator including: a damper tube including a closed end; a damper rod disposed at least partially within the damper tube and protruding therefrom opposite the closed end; a sliding spring seat having a disc shape disposed annularly around the damper tube, the sliding spring seat including an upper surface facing away from the closed end and configured to engage an end of a coil spring disposed coaxially around the damper rod; a support collar having a tubular shape disposed annularly around the damper tube and fixed to the sliding spring seat, wherein the support collar is configured to translate axially relative to the damper tube; a lifting bracket connected to the support collar and protruding radially from the support collar; and a hydraulic cylinder disposed adjacent and parallel to the damper tube, the hydraulic cylinder having a lift piston rod disposed at least partially within the hydraulic cylinder and extending outwardly therefrom toward the lifting bracket, wherein the lift piston rod is connected to the lifting bracket and configured to actuate the sliding spring seat between a retracted position and an extended position spaced apart from the closed end; and a controller operatively connected to the hydraulic cylinder and configured to control fluid flow into and out of the hydraulic cylinder for adjusting the height of the vehicle.

BRIEF DESCRIPTION OF THE DRAWINGS

Further details, features and advantages of designs of the invention result from the following description of embodiment examples in reference to the associated drawings.

DESCRIPTION OF THE ENABLING EMBODIMENTS

Figure 1:
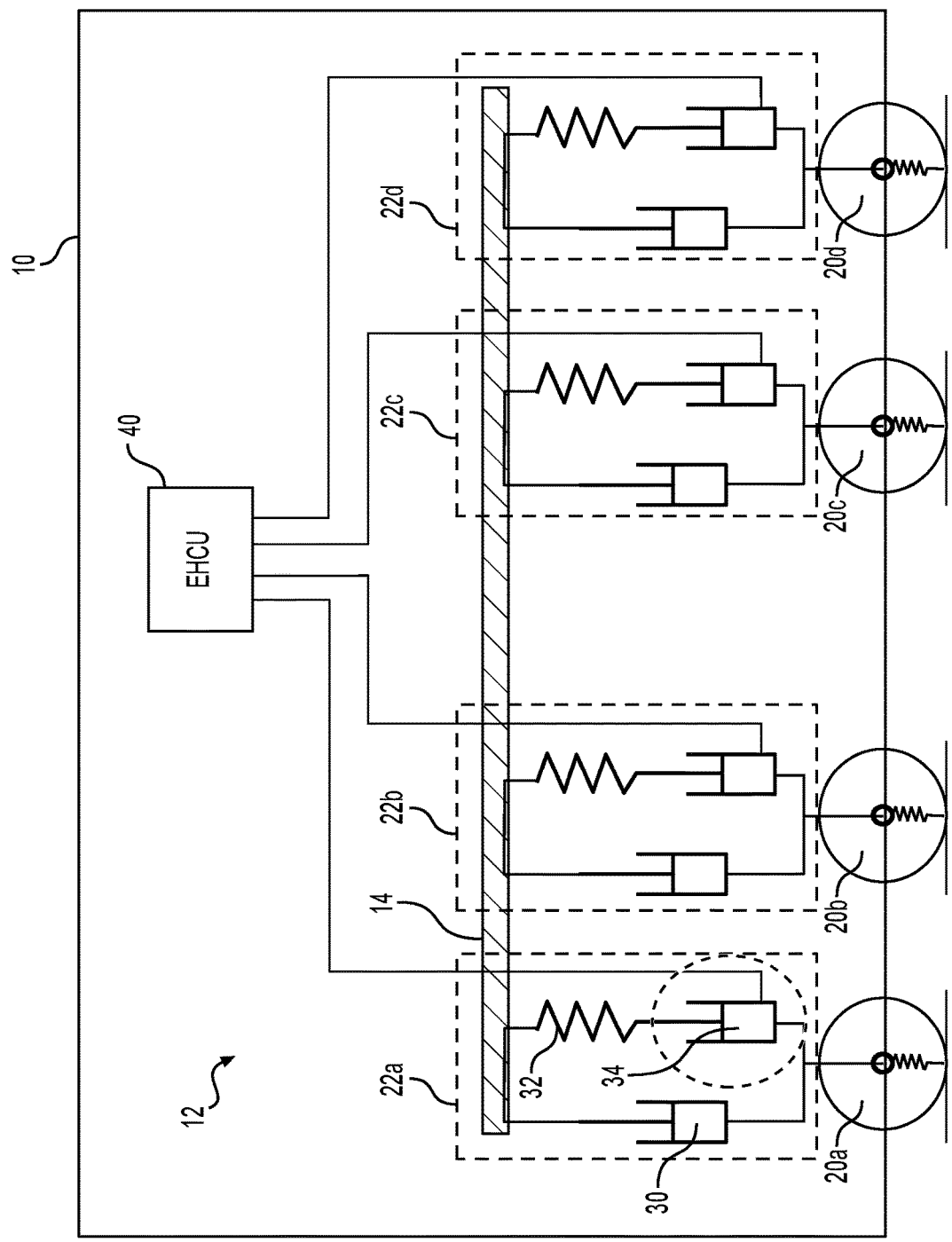
FIG. 1 shows a schematic block diagram of a vehicle with a system for adjusting height of the vehicle, in accordance with an aspect of the present disclosure.

Referring to the drawings, the present invention will be described in detail in view of following embodiments.

As shown in FIG. 1, a vehicle 10, such as a passenger car or truck, includes a height adjustment system 12 for adjusting the height of all or part of the vehicle 10. The vehicle 10 includes four wheels 20a. 20b, 20c. 20d. The four wheels 20a, 20b, 20c, 20d may include a front-left wheel 20a, a front-right wheel 20b, a rear-left wheel 20c, and a rear-right wheel 20d. However, the principles of the present disclosure may be implemented in vehicles having a different number of wheels, such as two wheels, three wheels or six wheels. Each of the wheels 20a, 20b, 20c, 20d is coupled to a corresponding suspension arrangement 22a, 22b, 22c, 22d.

For simplicity of explanation, only the front-left suspension arrangement 22a is described, however, the suspension arrangements 22a, 22b, 22c, 22d may be similar or identical to one another. Alternatively, the vehicle 10 may include two or more different configurations of the suspension arrangements 22a, 22b, 22c. 22d. For example, ones of the suspension arrangements 22a, 22b, 22c, 22d associated with the front wheels 20a, 20b may be different than ones of the suspension arrangements 22a, 22b, 22c, 22d associated with the rear wheels 20c, 20d.

The front-left suspension arrangement 22a includes a shock absorber 30 disposed between the front-left wheel 20a and a chassis element 14 of the vehicle 10. The chassis element 14 may include, for example, a body, a frame, or a subframe assembly. The front-left suspension arrangement 22a includes a coil spring 32 that connects the front-left wheel 20a and the chassis element 14 of the vehicle 10. A lift actuator 34 is disposed between the coil spring 32 and the front-left wheel 20a and is configured to change a position of the coil spring 32 to adjust a height of the front-left corner of the vehicle 10. Alternatively, the lift actuator 34 may be located between the coil spring 32 and the chassis element 14 of the vehicle 10.

The height adjustment system 12 may be configured to adjust a tilt of the vehicle 10 by changing heights of some of the suspension arrangements 22a. 22b, 22c, 22d differently than the heights of other ones of the suspension arrangements 22a, 22b, 22c, 22d. For example, the height adjustment system 12 may tilt the nose of the vehicle 10 downwardly by reducing the height of the lift actuators 34 on the front end while maintaining the height or lifting the height of the lift actuators 34 on the rear end.

The height adjustment system 12 includes an electro-hydraulic control unit 40 in fluid communication with each of the lift actuators 34 of the suspension arrangements 22a, 22b, 22c, 22d for controlling fluid flow therebetween and thereby controlling positions of each of the lift actuators 34. The height adjustment system 12 may include other components not shown in FIG. 1, such as an electronic controller, and/or one or more sensors, such as level sensors to provide feedback regarding the actual level of one or more of the suspension arrangements 22a, 22b, 22c, 22d.

Figure 2:
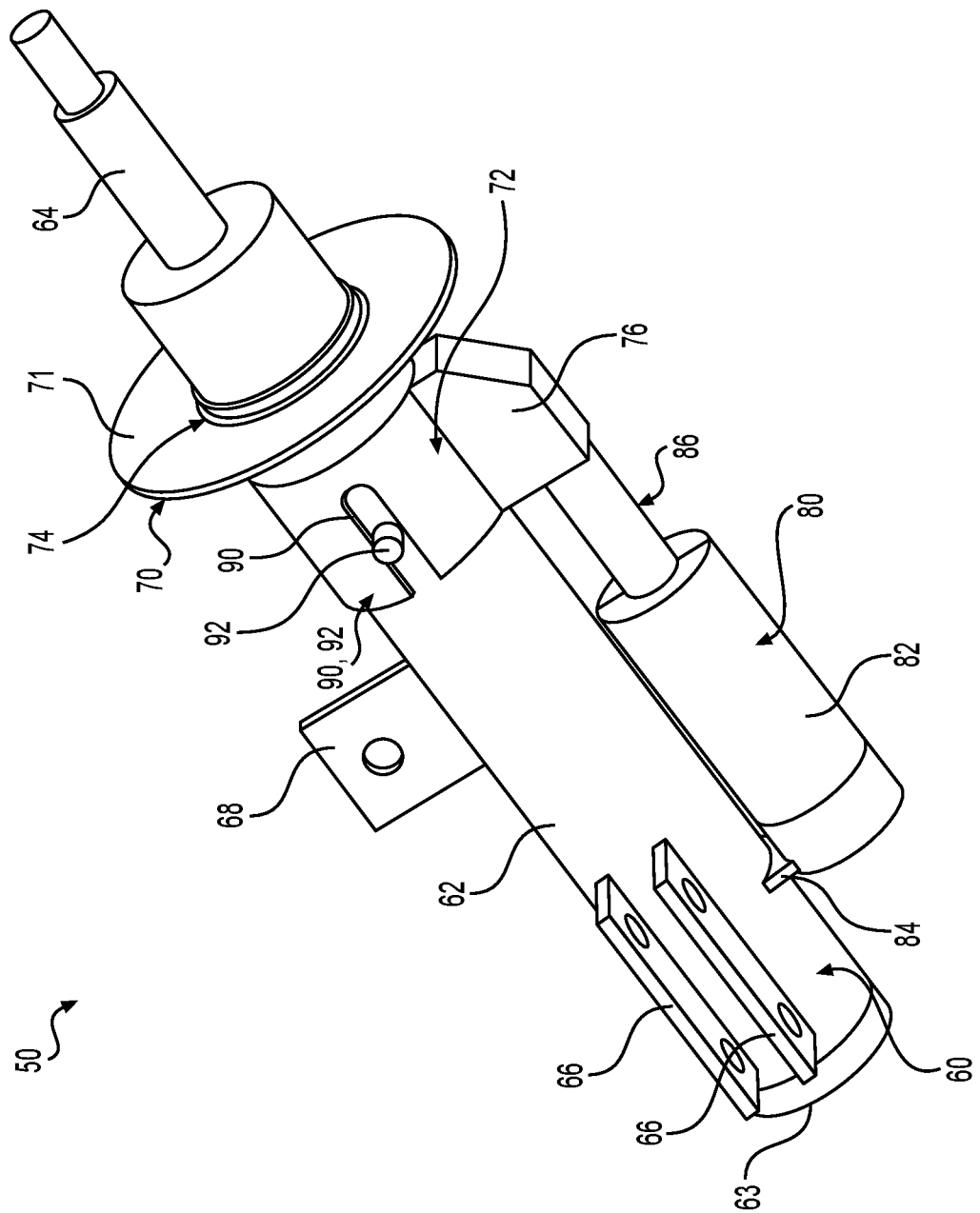
FIG. 2 shows a perspective view of a hydraulic lift actuator of the present disclosure.
Figure 3:
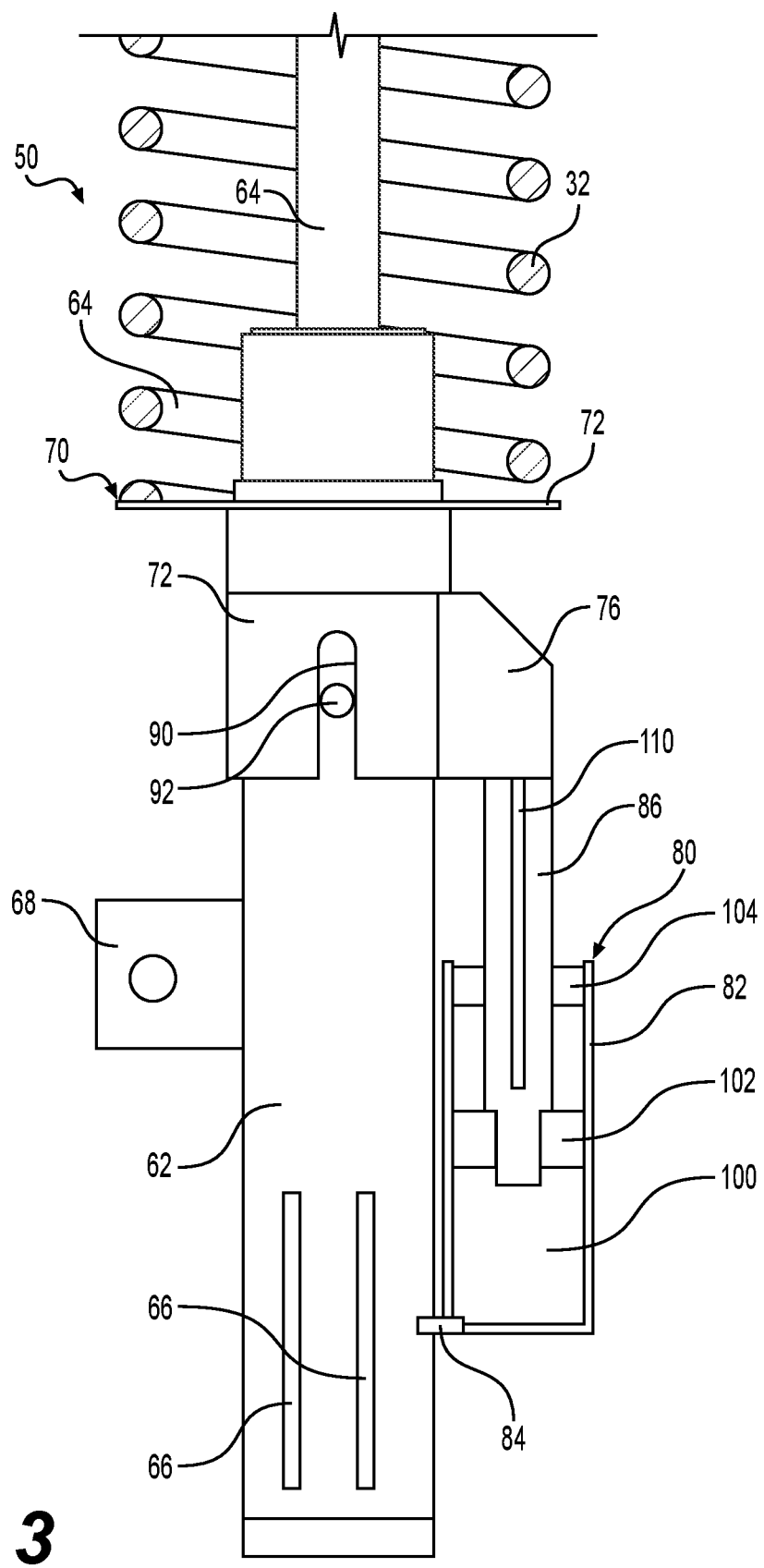
FIG. 3 shows a partial cut-away view of the hydraulic lift actuator of FIG. 2.

FIGS. 2-3 shows a hydraulic lift actuator 50 of the present disclosure. The hydraulic lift actuator 50 may be used as the lift actuator 34 in one or more of the suspension arrangements 22a. 22b, 22c, 22d. The hydraulic lift actuator 50 may be used in place of a conventional strut.

As shown in FIG. 2, the hydraulic lift actuator 50 includes a damper assembly 60, which may be similar or identical to a damper assembly of a conventional strut. The damper assembly 60 includes a damper tube 62 having a closed end 63. A damper rod 64 is disposed coaxially within the damper tube and extends axially outwardly therefrom, opposite from the closed end 63. The damper assembly 60 may include a piston, seals, and other features (not shown in the FIGS.) found in conventional strut dampers. The hydraulic lift actuator 50 also includes a first bracket 66 attached to a side of the damper tube 62 adjacent to the closed end 63 and configured for attachment to a suspension component, such as a knuckle, of the vehicle 10. The hydraulic lift actuator 50 also includes a second bracket 68 attached to the damper tube 62 for attachment to another suspension component, such as a sway bar link (not shown in the FIGS.).

The hydraulic lift actuator 50 includes a sliding spring seat 70 having a flat annular shape disposed annularly around the damper tube 62 adjacent to an end thereof opposite from the first bracket 66. The damper rod 64 extends through the sliding spring seat 70 and extends axially therefrom, away from the closed end 63 of the damper tube 62. The sliding spring seat 70 includes an upper surface 71 that faces away from the closed end 63 of the damper tube 62 and which is configured to engage an end of a coil spring 32 (not shown in FIG. 2 and shown in cutaway cross-section of FIG. 3). An opposite end of the coil spring 32 may engage the chassis element 14 of the vehicle 10. Thus, the height of the vehicle 10 may be adjusted by moving the sliding spring seat 70 relative to the damper tube 62.

A support collar 72 having a tubular shape is disposed coaxially around the damper tube 62 and is configured to slide relative thereto. The sliding spring seat 70 is fixed to the support sleeve. A guide 74, such as a tubular sleeve, is disposed between the damper tube 62 and the support collar 72 for reducing sliding friction therebetween. The guide 74 may be made of a material having a relatively low coefficient of friction, such as bronze, nylon, or Teflon. However, the guide 74 may include other materials. In some embodiments, the guide 74 may include a coating of the low-friction material, such as a coating on an inner surface and/or an outer surface thereof. A lifting bracket 76 protrudes axially outwardly from the support collar 72. The lifting bracket 76 may be fixed or otherwise attached to the support collar 72. For example, the lifting bracket 76 and the support collar 72 may be welded or integrally formed, such as by casting or machining.

The hydraulic lift actuator 50 also includes a lift actuator 80 including a hydraulic cylinder 82 that is fixed to the damper tube 62 by one or more mounting brackets 84. The hydraulic cylinder 82 extends parallel and adjacent to the damper tube. The lift actuator 80 also includes a lift piston rod 86 coaxial with and extending from the hydraulic cylinder 82 and attached to the lifting bracket 76 for actuating the sliding spring seat between a retracted position and an extended position.

In some embodiments, and as shown in FIGS. 2-3, the hydraulic lift actuator 50 includes an anti-rotation feature 90, 92 configured to prevent the sliding spring seat 70 from rotating relative to the damper tube 62, while allowing axial movement therebetween. The anti-rotation feature 90, 92 includes a slot 90 in the tubular wall of the support collar 72, and a peg 92 that extends axially outwardly from the damper tube 62. The peg 92 is configured to protrude through the slot 90 and to slide therein.

FIG. 3 shows the hydraulic lift actuator 50 with a partial cut-away showing internal features of the lift actuator 80. As shown on FIG. 3, the hydraulic cylinder 82 of the lift actuator 80 defines an internal chamber 100 that contains a working fluid, such as hydraulic oil. An actuator piston 102 is disposed in the internal chamber 100 and is coupled to the lift piston rod 86 for moving the sliding spring seat 70 in response to hydraulic force acting upon the actuator piston 102. The lift actuator 80 also includes a rod guide 104 that closes an end of the hydraulic cylinder 82. The lift piston rod 86 extends through the rod guide 104, and the rod guide 104 allows the lift piston rod 86 to translate axially therethrough, while limiting radial motion of the lift piston rod 86.

In some embodiments, and as shown in FIG. 3, the lift piston rod 86 defines a fluid passage 110 for conveying hydraulic fluid to and from the hydraulic cylinder 82 for actuation thereof. Alternatively or additionally, hydraulic fluid may be conveyed to and from the hydraulic cylinder 82 via other ports, such as ports in a side or an end of the hydraulic cylinder 82 (not shown on the FIGS.)

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic lift actuator for adjusting a height of a vehicle, comprising:
    a damper tube including a closed end;
    a damper rod disposed at least partially within the damper tube and protruding therefrom opposite the closed end;
    a sliding spring seat having a disc shape disposed annularly around the damper tube, the sliding spring seat including an upper surface facing away from the closed end and configured to engage an end of a coil spring disposed coaxially around the damper rod;
    a support collar having a tubular shape disposed annularly around the damper tube and fixed to the sliding spring seat, wherein the support collar is configured to translate axially relative to the damper tube;
    a lifting bracket connected to the support collar and protruding radially from the support collar; and
    a hydraulic cylinder disposed adjacent and parallel to the damper tube, the hydraulic cylinder having a lift piston rod disposed at least partially within the hydraulic cylinder and extending outwardly therefrom toward the lifting bracket, wherein the lift piston rod is connected to the lifting bracket and configured to actuate the sliding spring seat between a retracted position and an extended position spaced apart from the closed end,
    wherein the hydraulic lift actuator further includes a peg extending radially outwardly from the damper tube, wherein the support collar defines a slot extending in an axial direction and configured to receive the peg for preventing the sliding spring seat from rotating relative to the damper tube while allowing axial movement therebetween.

2. The hydraulic lift actuator of claim 1, further comprising a guide having a tubular shape and disposed between the damper tube and the support collar for reducing sliding friction therebetween.

3. The hydraulic lift actuator of claim 2, wherein the guide includes at least one of bronze, nylon, or Teflon.

4. The hydraulic lift actuator of claim 2, wherein the guide includes a coating of a low-friction material on at least one of an inner surface and an outer surface thereof.

5. The hydraulic lift actuator of claim 1, further comprising a first bracket attached to the damper tube adjacent to the closed end, wherein the first bracket is configured for attachment to a first suspension component of a vehicle.

6. The hydraulic lift actuator of claim 5, further comprising a second bracket attached to the damper tube and configured for attachment to a second suspension component of the vehicle.

7. The hydraulic lift actuator of claim 1, wherein the support collar and the lift bracket are integrally formed together.

8. The hydraulic lift actuator of claim 1, wherein the hydraulic cylinder defines an internal chamber that contains a working fluid, and wherein the hydraulic cylinder includes an actuator piston coupled to the lift piston rod and disposed within the internal chamber.

9. The hydraulic lift actuator of claim 8, wherein the lift piston rod defines a fluid passage for conveying the working fluid to and from the internal chamber.

10. A hydraulic lift actuator for adjusting a height of a vehicle comprising:
    a damper assembly including a first end and a second end opposite the first end;
    a damper rod disposed at least partially within the damper assembly and protruding through the second end;
    a sliding spring seat having a disc shape disposed on an outer surface of the damper assembly, the sliding spring seat including an upper surface facing away from the first end and configured to engage a lower end of a coil spring disposed coaxially around the damper rod;
    a support collar fixed to the sliding spring seat, wherein the support collar is configured to translate axially relative to damper assembly; and
    a hydraulic cylinder disposed adjacent and parallel to the damper assembly, the hydraulic cylinder having a lift piston rod disposed at least partially within the hydraulic cylinder and extending outwardly therefrom toward the support collar, wherein the lift piston rod is connected to the support collar and configured to actuate the sliding spring seat between a retracted position and an extended position spaced apart from the first end,
    wherein the hydraulic lift actuator further includes a peg extending radially outwardly from the damper assembly, wherein the support collar defines a slot extending in an axial direction and configured to receive the peg for preventing the sliding spring seat from rotating relative to the damper assembly while allowing axial movement therebetween.

11. The hydraulic lift actuator of claim 10, further comprising a lifting bracket rigidly connected to the support collar and protruding from the support collar, and wherein the lift piston rod is rigidly connected to the lifting bracket.

12. The hydraulic lift actuator of claim 10, further comprising at least one bracket attached to the outer surface of damper assembly, and wherein the at least one bracket is configured for attachment to at least one suspension component of a vehicle.

13. The hydraulic lift actuator of claim 10, further comprising a guide having a tubular shape and disposed between the damper assembly and the support collar for reducing sliding friction therebetween.

14. The hydraulic lift actuator of claim 10, wherein the lift piston rod defines a fluid passage for conveying a working fluid to and from an internal chamber within the hydraulic cylinder.

15. A height adjustment system for adjusting a height of a vehicle, the height adjustment system comprising:
    at least one wheel;
    a first suspension arrangement including:
        a coil spring having an upper end and a lower end, wherein the upper end is connected to the at least one wheel, and
        a hydraulic lift actuator including:
            a damper tube including a closed end;
            a damper rod disposed at least partially within the damper tube and protruding therefrom opposite the closed end;

a sliding spring seat having a disc shape disposed annularly around the damper tube, the sliding spring seat including an upper surface facing away from the closed end and configured to engage an end of a coil spring disposed coaxially around the damper rod;

a support collar having a tubular shape disposed annularly around the damper tube and fixed to the sliding spring seat, wherein the support collar is configured to translate axially relative to the damper tube;

a lifting bracket connected to the support collar and protruding radially from the support collar; and a hydraulic cylinder disposed adjacent and parallel to the damper tube, the hydraulic cylinder having a lift piston rod disposed at least partially within the hydraulic cylinder and extending outwardly therefrom toward the lifting bracket, wherein the lift piston rod is connected to the lifting bracket and configured to actuate the sliding spring seat between a retracted position and an extended position spaced apart from the closed end, wherein the hydraulic lift actuator further includes a peg extending radially outwardly from the damper tube, wherein the support collar defines a slot extending in an axial direction and configured to receive the peg for preventing the sliding spring seat from rotating relative to the damper tube while allowing axial movement therebetween; and a controller operatively connected to the hydraulic cylinder and configured to control fluid flow into and out of the hydraulic cylinder for adjusting the height of the vehicle.

16. The height adjustment system of claim 15, wherein the controller further includes an electronic control device and a hydraulic control device in an integrated package.

17. The height adjustment system of claim 15, further comprising a sensor configured to detect the height of the vehicle and transmit to a signal regarding the height of the vehicle to the controller.

18. The height adjustment system of claim 15, further comprising a second suspension arrangement with a second hydraulic lift actuator, and wherein the controller is configured to independently control each of the hydraulic lift actuator and the second hydraulic lift actuator.

* * * * *